(12) United States Patent
Stamerra

(10) Patent No.: US 6,980,896 B2
(45) Date of Patent: Dec. 27, 2005

(54) EARTH-MOVING VEHICLE INCLUDING PIVOTABLE MANEUVERING STATION

(75) Inventor: Alessandro Stamerra, Lecce (IT)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/935,887

(22) Filed: Sep. 8, 2004

(65) Prior Publication Data

US 2005/0126054 A1   Jun. 16, 2005

(30) Foreign Application Priority Data

Sep. 8, 2003   (IT) .................... TO2003A00681

(51) Int. Cl.$^7$ .................. G06F 19/00; G06F 7/70; G06G 7/00; G06G 7/76; G08B 21/00
(52) U.S. Cl. .................. 701/50; 340/465; 340/488; 340/684; 37/348; 37/413; 37/466
(58) Field of Search .................. 37/348, 382, 413, 37/466, 308; 701/50; 342/27; 363/93–94; 901/11–13, 901/46, 49, 50; 340/573.1, 684–691.8, 552–557, 340/463–490, 901–905

(56) References Cited

U.S. PATENT DOCUMENTS

| | | |
|---|---|---|
| 3,429,290 A | 2/1969 | Harris |
| 3,728,676 A | 4/1973 | Brown |
| 3,793,982 A | 2/1974 | Peterson |
| 4,296,286 A | 10/1981 | Richardson |
| 5,132,665 A | 7/1992 | Hutchisson et al. |
| 5,198,800 A * | 3/1993 | Tozawa et al. .......... 340/573.1 |
| 5,377,777 A | 1/1995 | Moore et al. |
| 6,025,778 A | 2/2000 | Dietz et al. |

* cited by examiner

Primary Examiner—Christopher J. Novosad
(74) Attorney, Agent, or Firm—John William Stader; Stephen A. Bucchianeri

(57) ABSTRACT

An earth-moving vehicle includes a carriage, which can move on a terrain in mutually opposite directions of movement along a longitudinal axis of the vehicle, and a station for driving and maneuvering, which is able to rotate with respect to the carriage about a vertical axis, houses a plurality of controls, and is oriented in a direction in which an operator is facing during maneuvering of the controls. The vehicle is further provided with a signaling device and with a control assembly, which activates the signaling device to warn, outside the station, when a direction of movement is actuated that is opposite to the direction of orientation of the station. The control assembly operates automatically according to the relative angular position of the station with respect to the carriage about the vertical axis and according to the command issued for the direction of movement.

10 Claims, 1 Drawing Sheet

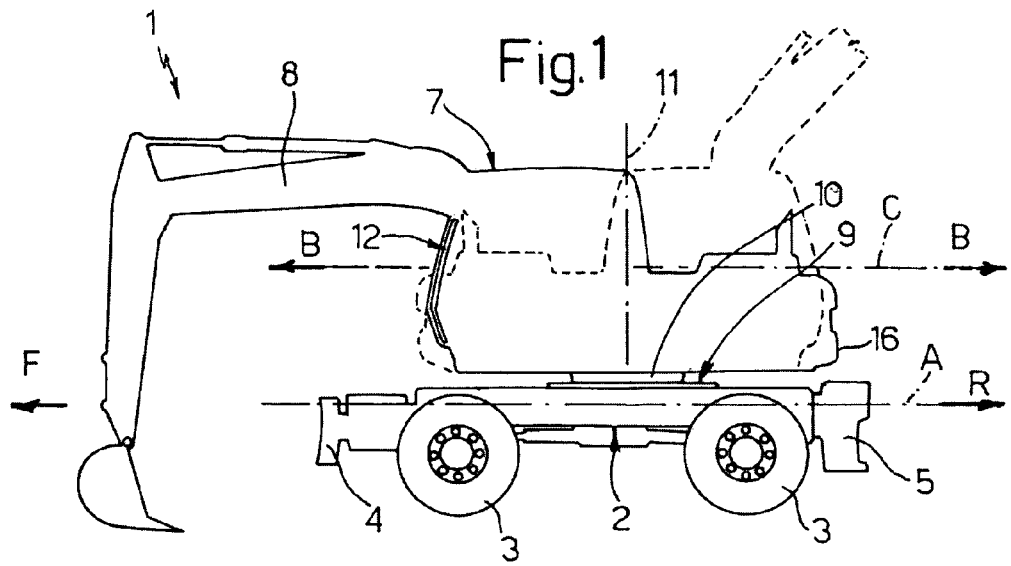
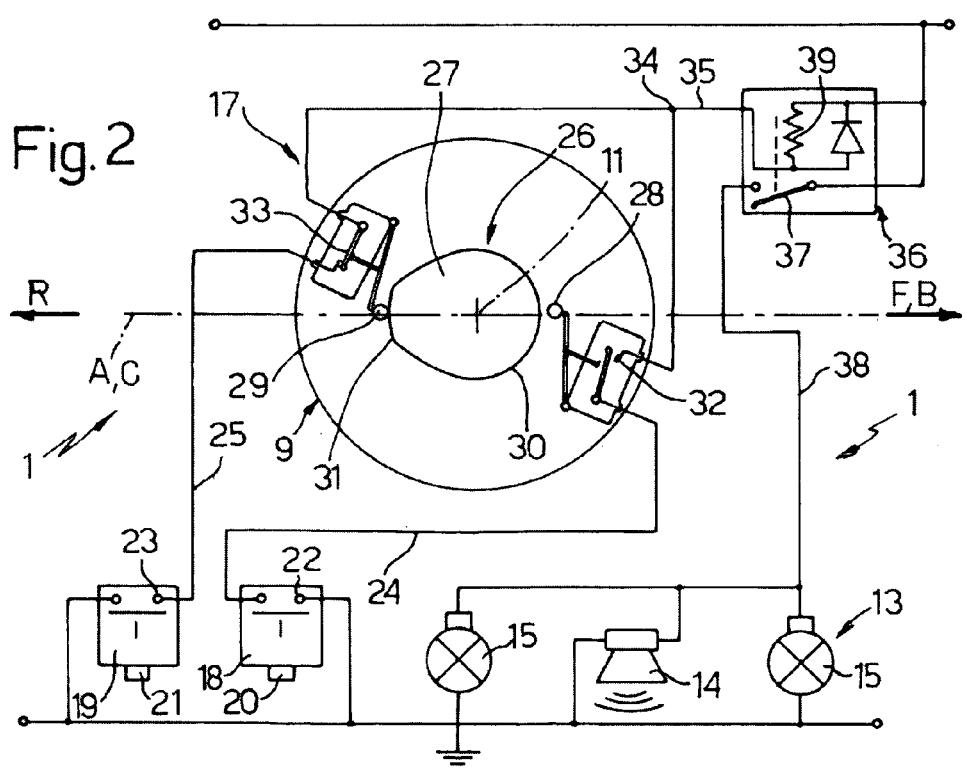

EARTH-MOVING VEHICLE INCLUDING PIVOTABLE MANEUVERING STATION

The present invention relates to an earth-moving vehicle provided with a station for driving and maneuvering which is able to rotate about a vertical axis with respect to a bottom carriage movable on a terrain by means of wheels or tracks.

Earth-moving vehicles, known as excavators, comprise a bottom carriage and a top turret, which is able to rotate about a vertical axis with respect to the carriage, and is provided with a movable operative arm and a station for driving and maneuvering, from which the operative arm can be controlled.

When the vehicle is travelling on the road and, in particular, when it is maneuvering on a work site, it is often necessary to control displacement of the bottom carriage along the longitudinal axis of the vehicle in a direction opposite to the one in which the operator is normally sitting and facing in the driving and maneuvering station. In such operating conditions, the operator has to control the displacement of the vehicle from his station looking over his shoulder, with consequent reduction both in terms of comfort and in terms of visibility as compared to maneuvers controlled when he is looking in front of him.

Consequently, the need is felt to provide devices for signaling and alarm that will issue warnings outside the vehicle, when the vehicle is moving longitudinally backwards with respect to the direction in which the operator is normally sitting in his station, regardless of the orientation with which the turret can rotate with respect to the bottom carriage about the vertical axis.

SUMMARY OF THE INVENTION

The purpose of the present invention is to provide an earth-moving vehicle provided with a station for driving and maneuvering that is able to rotate about a vertical axis, which will enable the needs set forth above to be met in a simple and economically advantageous way.

According to the present invention an earth-moving vehicle is provided which comprises a carriage, movable on a terrain in directions of movement opposite to one another along a longitudinal axis of the vehicle; a station for driving and maneuvering, able to rotate with respect to the carriage about a vertical axis, the station housing a plurality of controls and being oriented in a direction in which an operator is facing during maneuvering of the controls; a signaling device; and control means for activating the signaling device according to the relative angular position of the station and the carriage about the vertical axis and according to the direction of movement of the carriage, when the direction of movement is opposite to the direction of orientation of the station.

BRIEF DESCRIPTION OF THE DRAWINGS

The invention will now be described further, by way of example, with reference to the accompanying drawings, which illustrate a non-limiting example of embodiment thereof, and in which:

FIG. 1 is a schematic side elevation of a preferred embodiment of the earth-moving vehicle provided with a station for driving and maneuvering that is able to rotate about a vertical axis, according to the present invention; and FIG. 2 is a partial diagram of the vehicle of FIG. 1.

DETAILED DESCRIPTION OF THE PREFERRED EMBODIMENTS

In FIG. 1, the reference number 1 designates a (schematically illustrated) earth-moving vehicle comprising a bottom carriage 2 provided with wheels 3 (or else tracks, according to a variant which is not illustrated) for advance on a terrain in a direction A coinciding with the longitudinal axis of the vehicle 1 in mutually opposite directions of movement, designated by the letters F and R. In particular, if the structure of the carriage 2 is considered, the direction of movement F corresponds to the so-called "forward movement" in the direction of a front area 4 of the carriage 2, which, in the example illustrated, is provided with a blade for leveling earth, whilst the direction of movement R corresponds to the so-called "reverse" in the direction of a rear area 5 of the carriage 2, which is provided, in the example illustrated, with foldable stabilizing legs.

The vehicle 1 further comprises a top turret 7, which carries a mobile operative arm 8, of a known type and not described in detail herein, and is coupled to the carriage 2 by means of a coupling 9. The coupling 9 comprises a thrust bearing 10, which enables the turret 7 to rotate about a vertical axis 11 with respect to the carriage 2, for displacing the end of the arm 8 around the entire periphery of the vehicle 1. The coupling 9 houses a plurality of devices (not illustrated) which provide a connection for the hydraulic and electrical systems of the vehicle 1 between the turret 7 and the carriage 2 irrespective of the rotation of the turret 7 itself.

The turret 7 carries, moreover, a station 12 for driving and maneuvering, which is defined by a cab, which is fixed to the turret 7 and houses the controls (not illustrated) that are maneuvered manually, in use, by an operator for actuating the arm 8, for moving and steering the carriage 2, and for activating other devices and services of the vehicle 1.

The station 12 is oriented in a horizontal direction B, in which the operator is normally looking when he is sitting in the station 12 itself during manual maneuvering of the controls. It is evident that the direction B has an orientation fixed with respect to the turret 7 and is instead movable with respect to the carriage 2, when the turret 7 is made to rotate about the axis 11.

With reference to FIG. 2, the vehicle 1 further comprises a device 13 for optical and/or acoustic signaling, which is designed to issue an alarm on the outside of the station 12 when the vehicle 1 moves longitudinally in the direction opposite to the direction B, i.e., when the operator is maneuvering the controls in the station 12, looking over his shoulder or using rear-view mirrors.

In particular, the device 13 comprises an acoustic alarm 14 and two lamps 15, which form part of a set of lights for a light indication (not illustrated) carried by the turret 7 in an area 16 behind (see FIG. 1) with respect to the station 12, considering the direction B. The device 13 is activated by an automatic control assembly 17 (illustrated schematically), which is of an electromechanical type and operates according to the relative angular position of the station 12 and the carriage 2 about the axis 11 and according to the direction of movement F or R which is controlled by the operator.

The assembly 17 comprises a pair of pressure transducers 18, 19 arranged along respective hydraulic control lines 20, 21 (partially illustrated), which are designed to actuate the transmission of the carriage 2 in its movement "forwards" and in "reverse", respectively. The transducers 18, 19 are associated to respective switches 22, 23, which are arranged along respective electrical lines 24, 25 in parallel, are normally open, and switch into a closing position when the transducers 18, 19 detect the pressurization of the lines 20, 21 following upon issue of a command for displacement of the carriage 2 in the directions of movement F and R, respectively.

Once again with reference to FIG. 2, the assembly 17 further comprises a device 26 for detection of the angular position, forming part of the coupling 9 and comprising a cam 27 and two tappet rollers 28, 29. The cam 27 is fixed to the carriage 2 and is defined by a disk, the side surface of which comprises a circular portion 30 extending about the axis 11, and an eccentric radial portion 31 radiused to the portion 30 and facing the rear area 5. The tappet rollers 28, 29, on the other hand, are carried by the turret 7 and are diametrically opposite to one another with respect to the axis 11. The rollers 28, 29 are aligned to one another and to the axis 11 along a horizontal direction C on which the direction B lies, and are slidably coupled to the side surface of the cam 27 during at least part of the angular travel of the turret 7, i.e., at least when they encounter the portion 31. The tappet rollers 28, 29 define the push-buttons for switching the respective electrical switches 32, 33, which are arranged along the lines 24 and 25, respectively and in series with the respective switches 22 and 23. The switches 32, 33 are normally open but switch into the closing position when the corresponding tappet rollers 28, 29 are displaced radially outwards by the cam 27 encountering the portion 31.

The lines 24, 25 are connected by a common node 34 to an electrical line 35 entering in a relay 36 that forms part of the assembly 17. The relay 36 comprises a normally-open contact 37 set along an electrical supply line 38 of the device 13, and a coil 39, which is designed to be excited by the electric current passing in the line 35 for switching the contact 37 into the closing position and for activating the device 13 when the controlled direction of movement F, R is opposite to the direction B of orientation of the station 12.

In fact, considering a first operative condition (illustrated in FIG. 2 and, with a solid line, in FIG. 1), in which the direction B faces the front area 4 of the carriage 2, the switch 32 is in the contact-opening position, whilst the switch 33 is set in the closing position by the coupling between the portion 31 and the tappet roller 29. Upon actuation of the movement "forwards", the transducer 18 sets the switch 22 in the closing position, but both of the lines 24, 25 remain open by the switches 32, 33, so that the coil 39 remains de-energized, and the device 13 is not actuated. Conversely, if the "reverse" is actuated, the transducer 19 sets the switch 23 in the closing position and, hence, closes the line 25, which is traversed by an electric current defining an enabling signal which excites the coil 39, causing automatic closing of the contact 37 and the supply of current to the device 13.

Considering a second operative condition (illustrated with dashed lines in FIG. 1), in which the direction B faces the area 5 behind the carriage 2, the switch 33 is in the opening position, whilst the switch 32 is set in the closing position by the coupling between the portion 31 and the tappet roller 28. Upon actuation of the "reverse", the transducer 19 sets the switch 23 in the closing position, but the lines 24, 25 remain open via the switches 22, 33, so that the coil 39 remains de-energized, and the device 13 is not supplied.

If, on the other hand, the movement "forwards" is actuated, the transducer 18 sets the switch 22 in the closing position and, hence, closes the line 24, which is consequently traversed by an electric current defining an enabling signal which excites the coil 39, causing automatic closing of the contact 37 and electrical supply of the device 13.

When the station 12 assumes angular positions intermediate between the first operative condition and the second operative condition described above, the specific shape of the portion 31 with respect to the axis 11 and the relative position of the cam 27 and the tappet rollers 28, 29 may bring about switching of the switches 32, 33 at a predetermined orientation of the station 12 deviating from the fully longitudinal direction. Hence, the device 13 already may be activated with the station 12 facing in a more sideways direction.

From the foregoing, it will be appreciated how the assembly 17 enables automatic supply of an acoustic and/or light alarm on the outside of the station 12 in the presence of a potential danger due to a longitudinal displacement of the carriage 2 in the direction opposite to the direction B in which the operator is facing, the assembly operating according to the relative angular position of the turret 7 and the carriage 2 and according to the control of the direction of movement F, R.

In particular, the assembly 17 is very simple to produce and to be installed on vehicles, in so far as it uses readily available electrical components and just one dedicated component, i.e., the cam 27.

Furthermore, the relay 36 enables separation of the lines 35 and 38, which are thus traversed by electrical currents of different amplitude, i.e., by a relatively low current simply defining an enabling signal and by a relatively high supply current, respectively.

Finally, from the foregoing it will be understood that modifications and variations may be made to the vehicle 1 described herein, without thereby departing from the scope of protection of the present invention.

In particular, the cam 27 could be shaped in a way different from the one illustrated, for example for the purpose of enabling use of a single tappet roller, or else could be replaced by a different device for detection of the angular position, for example designed to issue a continuous signal of the angular position to an electronic control unit.

Furthermore, the device 13 could be set in series to the switches 22, 23, 32, 33 and supplied directly by the lines 24, 25, without the relay 36, or else could be activated by a member different from the relay 36.

Finally, the lamps 15 could be of a flashing type.

What is claimed is:

1. An earth-moving vehicle comprising:
    a movable carriage, the carriage having a longitudinal axis;
    a station for driving and maneuvering, the station being adapted to rotate with respect to the carriage about a vertical axis, housing a plurality of controls and being oriented in a direction in which an operator is facing during maneuvering of the controls;
    a control assembly, the control assembly operating according to both a relative angular position, the relative angular position determined from the position of the station and the carriage with respect to the vertical axis, and according to a direction of movement of the carriage, when the direction of movement is opposite to the direction of orientation of the station, the control assembly further comprising a first sensor for detecting the relative angular position and second sensor for detecting which control of the plurality of controls has been actuated, the first sensor comprising a cam fixed to one of the carriage and the station about the vertical axis, and at least one tappet element carried by the other of the carriage and the station and operatively engaging the cam during at least part of the rotation of the station about the vertical axis;
    a signaling device the signaling device being activated by the control assembly; and a turret which carries the station and is coupled to the carriage in such a way that the station is able to rotate about the vertical axis by means of a coupling, the first sensor forming part of the coupling.

2. A vehicle according to claim 1, wherein the cam is fixed to the carriage and the at least one tappet element is carried by the station.

3. A vehicle according to claim 2, wherein the side surface of the cam has a circular portion and an eccentric radial portion facing along the longitudinal axis.

4. A vehicle according to claim 3, wherein the first sensor comprises two tappet elements arranged on diametrically opposite parts with respect to the cam.

5. A vehicle according to claim 4, wherein the tappet elements define push-buttons for switching respective first switches.

6. A vehicle according to claim 5, wherein the second sensor comprises two pressure transducers arranged along respective hydraulic control lines, each designed to actuate a transmission in a corresponding direction of movement.

7. A vehicle according to claim 6, wherein the pressure transducers control switching of respective second switches arranged in parallel to one another and each in series with respective first switches.

8. A vehicle according to claim 7, wherein the control assembly receives at least one input signal indicating the detection signals of the first and second sensor and automatically activates the signaling device when the direction of orientation of the station is opposite to the direction of movement detected by the second sensor.

9. A vehicle according to claim 8, wherein the control assembly further comprises a relay set along a supply line of the signaling device and a coil that can be excited by the input signal for opening/closing the supply line.

10. A vehicle according to claim 9, wherein the signaling device comprises at least one of an acoustic alarm and a lamp fixed to the station.

* * * * *